Sept. 29, 1964  M. BRUENIG  3,150,900

SLIDING BEARING

Filed Aug. 20, 1962

INVENTOR.
MATTHIAS BRUENIG
BY William H. Kumer
AGENT

3,150,900
SLIDING BEARING
Matthias Bruenig, Parchimerstrasse 23, Hamburg-Rahlstedt, Germany
Filed Aug. 20, 1962, Ser. No. 217,893
Claims priority, application Germany, Sept. 11, 1961,
B 63,972
5 Claims. (Cl. 308—37)

This invention relates to sliding bearings of the sleeve type.

In a sliding bearing for a radial load, the pressure on the lubricant, which forms a film separating the rotating shaft from the inner surface of the stationary journal box, builds up as soon as a minimum theoretically predeterminable shaft speed is reached. In order to increase lubricant pressure at a nominal speed and thus the carrying capacity of the lubricant, this invention provides for a sleeve to be inserted between shaft and inner surface of the bearing journal and extending throughout the whole length of the journal. To properly serve its purpose, this sleeve is urged to rotate with the shaft at its full speed. In order to assure such rotation of the sleeve, it can be provided with one or more suitable noses or lugs which engage corresponding notches or recesses in the shaft; or the sleeve can be urged to rotate by making connection with the shaft through an intermediate resilient member joined to shaft and sleeve and being stressed in shear. A bearing as provided by this invention having such an interposed sleeve may properly be termed "sliding sleeve bearing" and this term will be used hereinafter when referring to such a bearing. The sleeve so interposed must be capable of substantially free movement within the clearance limits between itself and the shaft. With a sleeve arranged in the manner set forth, the pressure of the lubricant in the load-carrying areas between sleeve and shaft cam become a multiple of the pressure generally encountered under normal conditions in the corresponding areas between shaft and journal in a comparable conventional bearing.

In accordance with the object of the present invention, the increased pressure created between shaft and sleeve is introduced to the active sliding surfaces between sleeve and journal through holes, slots, pores or other perforations provided in the wall of the sleeve. Thus, the pressure of the lubricant at the active bearing surfaces under load can be made to be considerably higher than the corresponding pressure in a conventional sliding bearing of corresponding size with a similar lubricant and under similar operating conditions.

Some of the features and advantages of the present invention, when contrasted with the qualities of conventional sliding bearings, are—first—higher load-carrying capacity—second—lower minimum speed requirement for creating sufficient lubricant pressure to form a film on the loaded bearing surfaces—third—less severe requirements as to bearing clearance accuracy and—fourth—reduced active bearing surface area resulting in a bearing of smaller size for a given load and speed. The features just recited make the bearing as herewith disclosed particularly attractive for application in the field of gas-lubricated bearings in which hydrogen, air, steam or another gaseous medium is utilized as a lubricant.

Another feature of the invention is that by proper selection of clearance allowances between sleeve and journal, on the one hand, and between sleeve and shaft, on the other hand, it is possible to vary the carrying capacity of a certain lubricant in a bearing, whereby it becomes possible to employ only one grade of lubricant for a machine or a mechanism having numerous sliding bearings of different sizes for different speeds and operating under different loads. Analogously, the modification of a conventional sliding bearing by inserting a sleeve as proposed by this invention, has a similar effect on lubricating efficiency as a change to a lubricant of different viscosity or fluidity. Moreover, with a similar grade of lubricant, sufficient lubricant pressure under otherwise similar conditions can be obtained at considerably lower minimum speed than in comparable conventional sliding bearings.

With more forceful lubrication and increased lubricant pressure, a more substantial lubricant film is dragged into between the sliding surface under load, thus effecting higher bearing efficiency, less heat generation and a cooler bearing. Experience has shown that excessive edge pressure and cavitation occurrences are practically absent in a sliding sleeve bearing. Furthermore, excellent emergency-run possibilities have been observed in a bearing of the present invention. Even in case of seizing of the actual bearing surfaces between journal box and sleeve, the nose or lug urging the sleeve to rotate with the shaft, when properly dimensioned with such emergency in view, will shear off or release and emergency operation will take over in that now the shaft rotates within the sleeve.

Vibration phenomena occurring at high revolutions and known under the term 'oil whirl" are substantially damped in a sliding sleeve bearing as herewith disclosed. Moreover, more effective subpressure created at the oil-feeding point in a sliding sleeve bearing can, in some cases, render an oil pump superfluous.

The features recited above and other features and advantages of the invention will be more clearly understood from the following description referring to the accompanying drawing, in which FIG. 1 is a cross section through a bearing embodying one form of the present invention;

Figure 1:
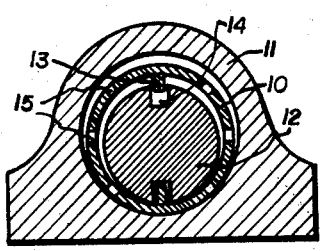
Figure 2:
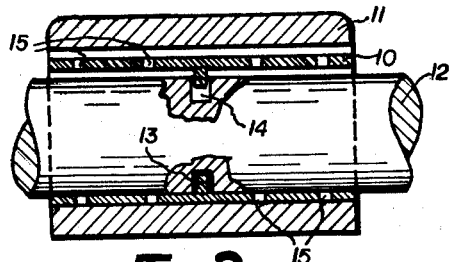
FIG. 2 is a longitudinal section through the bearing of FIG. 1 with the shaft not sectioned.
Figure 3:
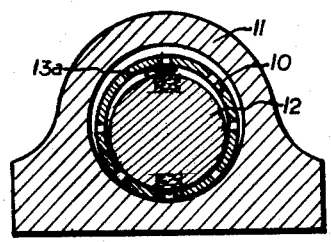
FIG. 3 is a cross section through a bearing showing springs as resilient connecting members between shaft and sleeve.
Figure 4:
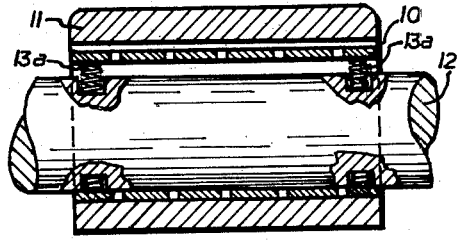
FIG. 4 is a longitudinal section through the bearing of FIG. 3 with the shaft not sectioned.

In the drawing, particularly FIG. 1, a sleeve 10 is shown interposed between the inner sliding surface of journal box or bearing block 11 and the shaft 12 which is journaled therein. For more impressive illustration, the clearance between the inner surfaces of the journals and the sleeves as between the shafts and the sleeves are shown exaggerated in all of the figures. Actually, these clearances are in the range of normal bearing clearances. In order to urge sleeve 10 to rotate at the same speed as shaft 12, some engaging or resilient connecting means are provided between these two members which connecting means are shown in FIGS. 1 and 2 in the form of lugs 13 secured to sleeve 10 and engaging notches 14 provided in shaft 12. It is of course possible to employ other connecting means such as pins, springs or collars of flexible or resilient material for forming the connection between shaft and sleeve as long as the sleeve retains its freedom to move freely within the clearance tolerance between sleeve and shaft, but is urged to rotate with the shaft at the full speed of the latter. Modified connecting means in the form of springs 13a secured to sleeve 10 and engaging shaft 12 are depicted in FIGS. 3 and 4. For lubricant communication between the clearance space at the shaft surface and the sliding space of the journal outside the sleeve, the sleeve 10 is provided with perforations and these are indicated in the several figures of the drawing in the form of holes 15. Other forms of perforations can be utilized or even the porosity of the sleeve material may be sufficient to convoy the lubricant pressure, built up between sleeve and shaft, to the outer sliding surface of the sleeve.

Figure 5:
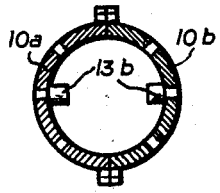
FIG. 5 is a cross section through a modified sleeve consisting of two half-sleeves to facilitate assembling.
Figure 6:
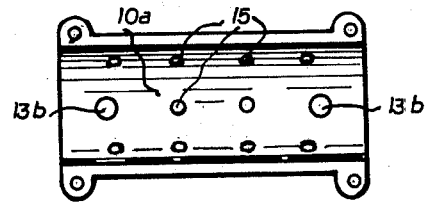
FIG. 6 is a plan view of one half-sleeve of the construction shown in cross section in FIG. 5.

In bearings where it is impossible to insert the shaft endwise into the bearing such as for crankshafts or the like, the sleeve can be divided lengthwise in two halves 10a and 10b as shown in FIG. 5. One of these halves 10a is illustrated in FIG. 6 in plan view. After being disposed on the shaft, the two halves are firmly joined together by rivets or the like, inserted through the ears shown at each corner, to function as a single sleeve unit. Both halves are shown with lugs 13b provided for engaging corresponding notches in the shaft. However, it will be understood that only one lug 13b and this only in one of the halves, when of adequate strength, will suffice to serve the purpose of urging the sleeve assembly to rotate with the shaft.

Figure 7:
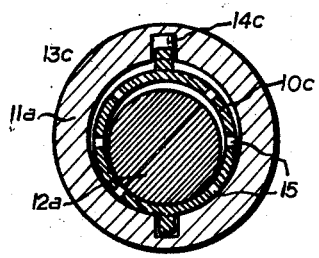
FIG. 7 is a cross section through a bearing modified for reversed action in which the shaft is stationary or non-rotating and the bearing in form of a hub revolving about the shaft, whereby the interposed sleeve is urged to revolve with the hub.
Figure 8:
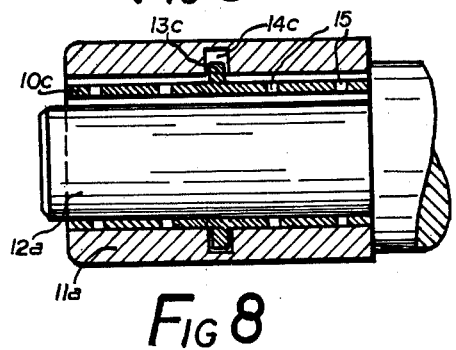
FIG. 8 is a longitudinal section through the bearing of FIG. 7 with the shaft not sectioned.

Bearings in which the shaft or pin is stationary or non-rotating and a bearing bushing or hub rotates about such shaft as, for instance, in an idler pulley, the sleeve as provided by this invention must rotate with the hub or bushing so that the sliding surfaces lie between the shaft and the sleeve. In such construction, as illustrated in FIGS. 7 and 8, the sleeve 10c must be urged to revolve with the bushing or hub 11a and the connection by means of lugs 13c and notches 14c or another resilient member must analogously be made between hub and sleeve so that the increased lubricant pressure builds up between these two members and is transmitted to the sliding surfaces through the holes 15 in the wall of the sleeve.

It will be realized that other modifications in details of construction can be effected in the present bearing without departing from the scope of this invention as defined in the claims.

What is claimed is:

1. A sliding bearing including a non-rotating member and a rotating member arranged one within the other to form a cylindrical space therebetween, a sleeve having perforations in its wall being arranged with inside and outside clearance in said cylindrical space, and means connecting said sleeve to said rotating member urging it to rotate at the speed of the latter but lending it freedom of radial movement within the limits of said cylindrical space.

2. A sliding bearing as in claim 1, wherein said means for connecting said sleeve to said rotating member comprises at least one lug secured to said sleeve and engaging at least one notch in said rotating member.

3. A sliding bearing as in claim 1, wherein said means for connecting said sleeve to said rotating member comprises at least one spring secured to said sleeve and engaging at least one notch in said rotating member.

4. A sliding bearing as in claim 1, wherein said sleeve is divided in axial direction and consists of two half-sleeves firmly joined to function as a single sleeve unit.

5. A sliding bearing having a bearing member with a bore large enough to provide a cylindrical space between said bore and a shaft to be journaled in said bearing member, a perforated sleeve arranged with inside and outside clearance in said cylindrical space, and means for connecting said sleeve to the shaft to be journaled in said bearing member urging said sleeve to rotate at the speed of the shaft but lending it freedom of radial movement within the limits of said cylindrical space.

References Cited in the file of this patent

UNITED STATES PATENTS

| | | |
|---|---|---|
| 471,405 | Terman | Mar. 22, 1892 |
| 1,625,568 | Shaw | Apr. 19, 1927 |
| 1,712,064 | Ashman | May 7, 1929 |
| 2,532,795 | Underwood et al. | Dec. 5, 1950 |